United States Patent Office 3,151,984
Patented Oct. 6, 1964

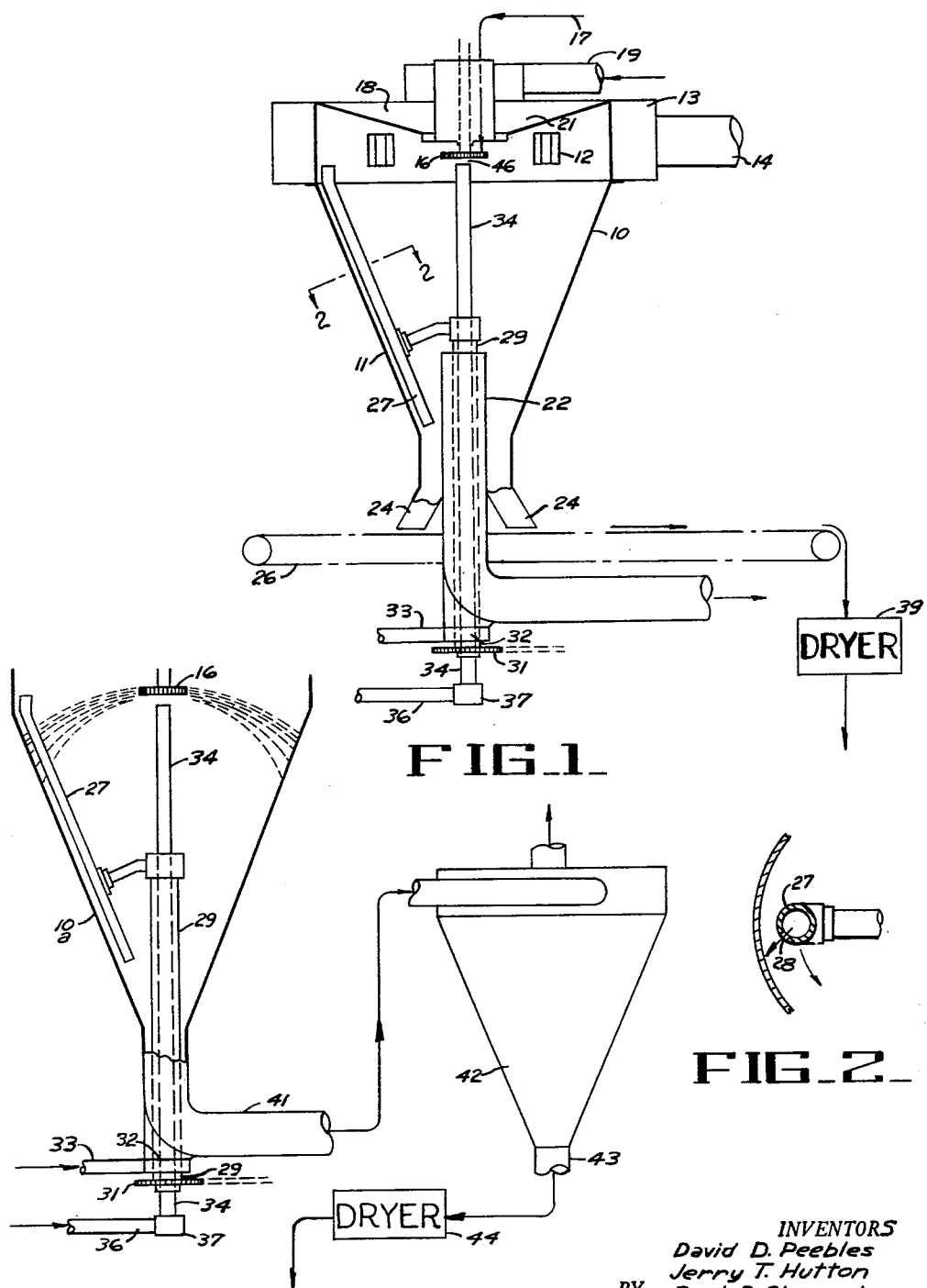

3,151,984
PROCESS FOR THE MANUFACTURE OF PRODUCTS IN AGGLOMERATED FORM
David D. Peebles, Davis, Jerry T. Hutton, San Rafael, and Paul D. Clary, Jr., Petaluma, Calif., assignors to Foremost Dairies, Inc., San Francisco, Calif., a corporation of New York
Filed Aug. 19, 1960, Ser. No. 50,629
5 Claims. (Cl. 99—56)

This invention relates generally to processes and apparatus for the treatment of food materials, particularly for imparting instant properties to the final product.

It is known that "instant" properties can be imparted to various dry food products. For example in the processing of milk products, an instant dry milk can be made in accordance with the procedure disclosed and claimed in Peebles 2,835,586. The final product in that instance is in the form of porous aggregates comprising powder particles firmly bonded together in random fashion. The process disclosed in said patent involves moistening spray dried milk powder to make the particles sticky, and causing the sticky particles to be brought in random contacts thereby forming moist porous aggregates. These aggregates are then dried without crushing, to produce the final product.

In addition to the process disclosed in Peebles 2,835,586, which involves the moistening of a powder, it is possible to manufacture an "instant" dry milk product by a straight through process, such as disclosed in Sharp and Kempf 2,921,857. The latter process is characterized by the fact that the material is spray dried to moist form, instead of to an anhydrous powder. The straight through process has the advantage of simplicity, and is deemed more economical than the process of said Patent 2,835,586. It is particularly advantageous where a large tonnage of instantized product may be made at one plant installation, starting from an available source of raw liquid material. The process of Peebles 2,835,586 is advantageous where it is more convenient to start with an available source of anhydrous spray dried powder.

In the past no process or equipment has been available which will permit either the instantizing of a powder, or a straight through conversion of liquid material to the form of an instant dry product.

In general it is an object of the present invention to provide a process and apparatus which will enable either the manufacture of an instant dry powdered milk product by a novel straight through procedure, from the raw material, or by a novel procedure involving moistening a spray dried anhydrous milk powder.

Another object of the invention is to provide a process which facilitates the controlled moistening of a dry powder.

Another object of the invention is to provide a novel process for the controlled moistening of a powdered material, and also for the formation of moist porous aggregates.

Another object of the invention is to provide a novel process for the straight through conversion of a liquid material to a dry instantized product.

Another object of the invention is to provide an apparatus of the above character having great flexibility with respect to the procedures available for its utilization, and which will permit a variety of processing operations.

Additional objects and features of the invention will appear from the following description in which the preferred embodiments have been set forth in detail in conjunction with the accompanying drawing:

FIGURE 1 is a side elevational view, schematically illustrating apparatus for carrying out the present process.

FIGURE 2 is an enlarged cross-sectional detail taken along the line 2—2 of FIGURE 1.

FIGURE 3 is a view like FIGURE 1, but showing another embodiment.

The apparatus disclosed herein is capable of producing a dry divided material for depositing upon the walls of the treatment chamber, in either one of several ways, including the wetting of a spray dried anhydrous powder, and the drying of a liquid concentrate to the form of a moist divided material.

The equipment illustrated particularly in FIGURES 1 and 2 consists of a treatment chamber 10 which for convenience is disposed upon a vertical axis, and which has a conical shaped section 11. The upper portion of the treatment chamber is in communication, through louvered openings 12, with the plenum chamber 13, which in turn is connected by conduit 14 to a source of air. Within the chamber there is a centrifugal atomizer head 16, of the type commonly used in the spray drying of milk powder. Line 17 represents means for introducing a liquid feed to the atomizer. Another plenum chamber 18 is connected to the air supply conduit 19, and is adapted to deliver hot air downwardly about the atomizer, through the annular orifice 21.

The chamber 10 also connects with an upstanding exhaust conduit 22, having its upper open end terminating well within the chamber at a substantial distance below the atomizer head 16.

By virtue of swirling movement of drying air within the chamber 11, centrifugal separation takes place, with most of the divided material being deposited on the inner surfaces of the conical chamber section 11. Eventually, such separated material is removed through the discharge outlets 24, and may be deposited upon the conveying means 26 of the endless belt type.

Divided material depositing upon the inner surfaces of the conical section 11 of the chamber is periodically dislodged by means which may be referred to as an airsweep. This airsweep consists of a pipe 27, which extends parallel along the inner surface of the conical portion 11, and which is provided with a plurality of slots or openings 28 distributed along its length for delivering air jets against the adjacent side walls (see FIGURE 2). The jets are directed toward the inner surface of the conical section 11, and forwardly in the direction of movement of pipe 27, as shown in FIGURE 2. Pipe 27 is carried by an upstanding pipe 29, which extends concentrically through the conduit 22, and which is suitably journaled and connected at its lower end to suitable drive means, such as a chain and sprocket drive 31. By means of a suitable coupling 32, pipe 29 is in communication with a pipe 33, the latter being connected to a source of air under pressure. The pipe 27 normally is rotated at a predetermined speed, as for example from 1 to 5 r.p.m., and serves continuously and cyclically to dislodge divided material accumulating upon the walls of the conical portion 11, whereby the dislodged material discharges by gravity through outlets 24.

Means is provided for introducing material into the region near one side of the atomizer head 16. For this purpose we have shown an upstanding pipe 34, which extends concentrically through the conduit 22 and pipe 29. Exteriorly this pipe is in communication with pipe 36, through the coupling 37.

The material being delivered from the chamber 10 to the conveyor 26, may have a moisture content (total) of the order of 10 to 20% (13 to 16% optimum). This moist material is supplied to a finishing dryer 39, where excess moisture is removed to produce a final product containing for example from 3 to 4% moisture (total). Care should be taken during the drying operation 39 to avoid the use of excessive temperatures or prolonged heat treatment, such as might injure heat sensitive components of the material. By way of example, it is satisfactory to use drying air at a temperature of about 260 with a total drying time of the order of 1 minute or less.

In the apparatus of FIGURE 1, a separation is effected between the material discharging from the chamber and the air-stream, without the use of extra cyclones or like equipment. In equipment of FIGURE 3, the conduit 22 is omitted, and the lower end of the treatment chamber 10a is directly connected to the conduit 41, which removes both exhaust air and divided material. This conduit is shown connected to the exterior separating cyclone 42, whereby the divided material is discharged through conduit 43 to the dryer 44.

Use of the apparatus described above will first be explained with respect to a process involving the moistening of spray dried powder, to produce an instantized product. Assuming for example that one desires to use the apparatus for instantizing spray dried skim milk powder, heated air is supplied to the conduits 14 and 19, whereby an atmosphere at an elevated temperature, preferably from 100–130° F., is maintained within the treatment chamber 10. A liquid wetting material, such as water, is supplied by line 19 to the centrifugal atomizer head 16. Some down draft can be maintained by continuously introducing atmospheric air into conduit 19, thereby directing the spray of atomized water from the atomizing head downwardly in the form of an umbrella. It has been found that under such conditions a region of negative pressure exists in the space 46, immediately underlying the centrifugal atomizer head. The upper open end of conduit 34 terminates in this region of negative pressure. Spray dried skim milk powder together with a stream of conveying air, is delivered through conduits 33 and 34 and into the region 46 of negative pressure. As a result the powder so introduced moves outwardly and is intimately commingled with the atomized particles, thus causing the powder to be wetted, and at the same time causing random contacts between the wetted particles. The wetted particles of spray dried powder, which contain lactose in anhydrous form, are made sticky as explained in said Patent 2,835,586 and as a result when they are brought into random contacts, they adhere together to form moist porous aggregates. The majority of such moist material deposits upon the side walls of the conical section 11 as a porous layer, where the material remains until dislodged by the air jetting from the rotating pipe 27. While at rest upon the side walls of the conical section 11, some hydration of lactose occurs. In other words some lactose is converted to the form of alpha lactose monohydrate. Also there is some firming of the material, with firmer bondage between individual powder particles to form the desired aggregates. In general, the holding period within the chamber 10 is relatively constant for all of the material and may range from about 10 to 60 seconds, depending upon various factors, including particularly the speed of rotation of the air sweep.

Assuming use of the apparatus of FIGURE 1, exhaust air is delivered through conduit 22, and the material being treated is delivered through outlets 24, to the conveyor 26. This moist material is then delivered to the finishing dryer 39, where excess moisture is removed, after which the product can be subjected to suitable sizing operations, as by screening. The net result is a material which has good instant properties, and which is in the form of porous aggregates having a size such that the bulk of the material will pass through an 18 mesh screen, but remains upon a 100 mesh screen.

Assuming that the apparatus of FIGURE 3 is operated in the same manner as described above, the only difference is that the material is removed from the treatment chamber by way of conduits 41, together with a stream of air, and is separated from the conveying air in the cyclone 42.

The procedure described above can be modified in various ways. Instead of using water for the wetting operation, it is preferable to use a milk or milk concentrate, in suitable proportions with respect to the supply of spray dried powder, to provide the desired moisture content in the material deposited upon the side walls of the chamber. At the same time the temperature of the air supplied through conduits 14 and 19 can be increased to levels above 212° F., whereby moisture is removed from the atomized concentrate. In general this serves to increase the capacity of a given piece of equipment.

Another procedure for which the apparatus is applicable, is as follows: Assuming again that one desires to produce an instantized milk powder, liquid skim milk concentrate, to which seed crystals of alpha lactose monohydrate has been added, is supplied to the centrifugal atomizer head 16, thereby producing a spray consisting of atomized particles of a concentrate, a substantial number of such particles containing seed crystals. Hot drying air is supplied to conduits 14 and 19, whereby a drying atmosphere is maintained within the treatment chamber, with a down draft being delivered through orifice 21 to direct the spray downwardly, or in other words into the form of an umbrella. With proper control of drying conditions, the amount of moisture removed can be such that the material is reduced to the form of a divided and aggregated material, having a moisture content of the order of from 10 to 20%. This moist material collects upon the side walls, where it remains for a predetermined time, until it is dislodged by the air jetting from the pipe 27. The dislodged material is then removed from the chamber and subjected to secondary drying as previously explained. When the apparatus is used in this fashion, the pipe 34 and connected parts may not be used. However if desired some dry powdered material can be introduced by way of this pipe, to commingle with the atomized particles of the concentrate, thus increasing the capacity of the equipment by aiding in the absorption of moisture.

Various expedients can be employed for mixing a predetermined amount of finely divided lactose crystals with the concentrate being supplied to the atomizer head. One procedure which we have found to be effective is to pass the concentrate through a small mixing chamber, with the continuous introduction into the mixing chamber of the desired amount of finely divided lactose crystals. This procedure serves to directly intermix the seed crystals with the concentrate, with the concentrate immediately thereafter being supplied to the atomizer head.

It will be evident from the foregoing that I have provided a process and equipment which can be used for various proceses, and which in particular can be used for the manufacture of instantized products. The apparatus is adaptable to a variety of procedures, thus making particular installations more practical and flexible. An important aspect of the process involved, is that substantially all of the material is deposited upon the side walls of the treatment chamber, where it is permitted to remain for a predetermined period of time, after which it is removed by the air jets from pipe 27. The period of rest of this layer of material upon the side walls of the chamber affords an opportunity for proper bonding of particles together, whereby the final product is in the form of firm aggregates, which have high wettability and which therefore have the desired instant properties.

We claim:

1. In a process for the manufacture of instantized dry milk products in the form of porous aggregates, the steps of forming in a treatment zone moist divided material comprising milk solids in the form of porous aggregates having a total moisture content of the order of 10 to 20%, the treatment zone being on a vertical axis and formed by a chamber having a lower conical shaped section, depositing most of the moist aggregated material while at said moisture content as a porous layer on the walls of said conical shaped section, periodically subjecting said deposited moist porous layer to jetting air to periodically discharge the same from said walls whereby in a given region of said walls a layer accumulates for a predetermined period of time and is then substantially completely dislodged by said jetting air in the form of moist porous aggregates, discharging said dislodged moist aggregates from the lower end of said section and then removing excess moisture from the same.

2. A process as in claim 1 in which the moist porous divided material is formed by atomizing a concentrate together with seed crystals of lactose within the treatment zone, and by maintaining a drying atmosphere therein.

3. A process as in claim 1 in which the moist porous divided material is formed by atomizing an aqueous liquid in said zone and by simultaneously commingling a dry milk powder with the atomized particles of liquid.

4. A process as in claim 1 in which the aqueous liquid is atomized to form a spray extending outwardly and around a central region of substantial area and in which the dry milk powder is introduced simultaneously into a region adjacent one side of said area whereby said powder is caused to flow outwardly and then commingle with the spray of aqueous liquid.

5. In a process for the manufacture of an instantized dry milk product, the steps of subjecting a milk concentrate to atomization together with seed crystals of lactose, said atomization being in an annular region surrounding a circular area of substantial diameter, causing the atomized particles together with said seed crystals to progress outwardly from said region in a treatment zone, maintaining a drying atmosphere in said zone whereby the atomized particles are dried to a total moisture content of the order of 10 to 20% and the particles caused to adhere together in the form of aggregates, causing the moist porous material thereby produced to be deposited and to accumulate as a moist porous layer on walls surrounding said treatment zone, directing rotating jets of air against said accumulated layer thereby periodically and progressively dislodging said deposited material from said walls and whereby any particular portion of said layer accumulates for a predetermined period of time and is then substantially completely dislodged, collecting the dislodged material as moist aggregates, and then removing excess moisture from the discharged material.

References Cited in the file of this patent

UNITED STATES PATENTS

| | | |
|---|---|---|
| 1,266,013 | Gray | May 14, 1918 |
| 1,762,026 | Nyrop | June 3, 1930 |
| 1,946,566 | Bowen | Feb. 13, 1934 |
| 2,016,592 | Chuck | Oct. 8, 1935 |
| 2,627,463 | Meade | Feb. 3, 1953 |
| 3,042,526 | Spiess et al. | July 3, 1962 |